United States Patent
Grabner et al.

[15] 3,664,926
[45] May 23, 1972

[54] CRYSTALLIZATION OF L-ASPARAGINASE

[72] Inventors: Roy W. Grabner, North Plainfield; Morris Zimmerrman, Edison; William L. Subjack, Rahway; Daniel F. Veber, Westfield, all of N.J.

[73] Assignee: Merck & Co., Inc., Rahway, N.J.

[22] Filed: Feb. 26, 1970

[21] Appl. No.: 14,650

[52] U.S. Cl. .........................................................195/66 A
[51] Int. Cl............................................................C07g 7/02
[58] Field of Search ................................................195/66 A

[56] References Cited

OTHER PUBLICATIONS

Ho et al., Science 165, 510–511 (1969)
Dixon et al., Enzymes, 2nd Ed. 1964 pp. 44–46
Ho et al., Federation Proceedings, Vol. 28 No. 2 pp. 728

*Primary Examiner*—Lionel M. Shapiro
*Attorney*—I. Louis Wolk, J. Jerome Behan and John Frederick Gerkens

[57] ABSTRACT

L-asparaginase is obtained in crystalline form from aqueous solutions thereof by the use of a water miscible, polar organic solvent and pH control.

9 Claims, No Drawings

3,664,926

CRYSTALLIZATION OF L-ASPARAGINASE

BACKGROUND OF THE INVENTION

This invention relates to processes for the crystallization of L-asparaginase which has been shown to possess anti-leukemia activity. The crystals are obtained substantially free of inorganic impurities as well as proteinaceous and enzymatic impurities.

L-asparaginase is known to possess anti-tumor activity. In searching for a more productive source of the enzyme, *Escherichia coli* was shown to be a microorganism capable of producing said enzyme. The enzyme obtained from the processes of isolation and purification of the *E. coli* fermentation broth up to now has been of an amorphous nature.

Where attempts at crystallization of L-asparaginase have succeeded it has been either through precipitation with a concentrated aqueous salt solution (*Science* 165, pg. 510) or from an aqueous solution of a high molecular weight polyol (South African patent 68/8393, Dec. 20, 1968). The former method has the disadvantage of producing a crystal which may be pure, in that it contains but one enzyme, but associated with or incorporated within the crystal lattice are quantities of inorganic salt. As the enzyme crystal grows it traps some inorganic salt molecules within its lattice structure. This process is inevitable when there is a large concentration of inorganic salts in solution with the enzyme in the crystallization medium. When the L-asparaginase thus obtained is used as a medicament, a quantity of inorganic salt is introduced into the subject being treated. This could have deleterious effects if large doses and/or prolonged treatment are necessary.

The polyol crystallization method has the disadvantage of being a multi-step process which requires fractional precipitation and results in crystals which must thereafter be washed with a suitable solvent in order that the high molecular weight polyols are completely removed from the enzyme.

SUMMARY OF THE INVENTION

By our invention, we have succeeded in obtaining pure, crystalline L-asparaginase in one step. According to this invention, we have obtained crystalline L-asparaginase by crystallizing the enzyme from an aqueous solution which may be very dilute or very concentrated in inorganic salt content. The concentration may range from 0 to 70 percent salt content of the total solids in solution. Crystals are obtained in either case with equal facility thus demonstrating that this process needs no added salts for crystal growth and that said process is capable of selectively separating the enzyme from a large quantity of inorganic salts. Crystals have been obtained where the inorganic salts make up 70 percent of the total solids in solution and of the remaining 30 percent of the solids, which are enzymatic, only 15% is asparaginase. The crystals obtained therefrom were found to be free from inorganic and proteinaceous impurities and possessive of 90 percent of the L-asparaginase activity present in the original solution. It has been found that crystalline L-asparaginase is obtained in the absence of salts in solution thus demonstrating that the inorganic ions are not needed for crystal growth. The bulk of the ions present in solution are derived from the production process and are not added by the crystallization process. The only ions added during this crystallization process are from the very dilute acids and bases used for pH control and buffering agents such as sodium acetate or potassium dihydrogen phosphate. They are not found in the crystals of L-asparaginase thus obtained.

The crystalline L-asparaginase produced by this invention is substantially free of the metal ion of inorganic salts, which are known to become incorporated within the crystal lattice with facility where present during crystallization. Prior crystallizations of L-asparaginase which resulted from precipitation with a saturated salt solution, did not afford truly crystalline material since the salt was present in such a concentration that it was more than an impurity of the crystal, but actually became an integral part of the crystal lattice. A spectrographic analysis of the crystalline enzyme obtained by our process shows no more than 0.9 percent ash sulfated, which is constituted primarily of trace contaminents, with no single ion being present in significant quantity over the others. Thus the L-asparaginase crystal obtained by our process is made up of proteinaceous material, with no incorporated inorganic ions, to the extent of at least 99.1 percent enzyme.

The process of crystallization of L-asparaginase of this invention is practiced starting with aqueous solutions of impure enzyme, said impurities consisting of inorganic salts and other proteinaceous material. The process of crystallization comprises use of a water miscible organic solvent, and pH control which, under the optimum conditions detailed below, produces L-asparaginase of high purity, in a crystalline form, substantially free of inorganic salts, and usually in only one step. It is to be noted that modifications of the above process may utilize only one of these two process conditions. Each such process condition in and of itself is sufficient to produce crystalline L-asparaginase. If solvent control is the sole variable, maintaining the pH at a constant value, crystals will still be obtained. Similarly, if the solvent composition is maintained at a constant value and the pH is varied, crystals will be obtained. In this latter variation however, yields will be somewhat diminished. The optimum conditions are attained when both the pH and solvent are varied. This process produces the greatest yield of crystalline L-asparaginase recovered. However, temperature variations have been observed to have an effect on the rate of crystallization, lower temperatures having the effect of producing crystals at a higher rate. The crystals obtained at lower temperatures have also been observed to be somewhat smaller than those obtained at a higher temperature. However, no difference in the quantity or quality of the crystals is observed. Temperature variation is primarily a rate determinative factor and not a solubility determinative factor.

The L-asparaginase used as starting material may be obtained from any source, one suitable source being fermentation of a nutrient medium with an asparaginase producing strain of *E.coli* and extracting the harvested cells with an aqueous medium to obtain a proteinaceous extract of L-asparaginase. This extract contains much other proteinaceous material which should be removed prior to crystallization. DNA may be removed with any known DNA precipitant, for example, manganous chloride, protamine sulfate, and streptomycin sulfate. Other undesirable proteinaceous material may be removed by fractional precipitation using a known protein precipitant such as ammonium sulfate or ammonium acetate, leaving L-asparaginase in solution. The L-asparaginase solution may be treated according to the process of this invention as is or the enzyme may be precipitated amorphously using salt precipitation methods known in the art and redissolved in water for crystallization. The solution, for crystallization by the method of this invention, should contain a minimum of 300 units of L-asparaginase activity per ml. of solution, or equivalently, 3 mg. of the enzyme per ml. of solution. If the activity or concentration is appreciably less than this, crystallization will not result. One unit of L-asparaginase activity is defined as that amount of the enzyme which causes L-asparagine to liberate 1.0 micromole of ammonium nitrogen per minute as it is converted to L-aspartic acid as is determined by a standard testing procedure known in the art.

PREFERRED EMBODIMENT OF THE INVENTION

In the preferred embodiment of our invention, both of the factors which control the degree of solubility of the enzyme, that is, solvent control and pH control, are employed. A solution of impure L-asparaginase in water may be treated with a water miscible organic solvent. Following the solvent addition, or optionally prior to it, the pH may be adjusted to a point of minimum solubility of the enzyme in water. The order of the above steps is not critical to the performance of this embodiment of the invention and crystals are obtained of equal quantity and quality with either order.

The water miscible organic solvents of preference in this invention are loweralkanols. By "lower" is meant the alcohols of from one to three carbon atoms, methanol, ethanol, and propanol. The amount of solvent added to the aqueous solution of L-asparaginase depends on the particular solvent employed, the concentration of the enzyme in the solution, and the concentration of impurities in the solution. Generally the solvent is added such that it is 10 to 250 percent of the volume of the aqueous solution. As a general rule, the higher alcohols are used in smaller volumes due to their greater precipitating power. The optimum proportion of solvents added is realized if the volume of solvent is 25 to 100 percent of the volume of water. If too much solvent is used, an amorphous solid results. This occurs even if crystallization has already started. The fact that crystals are present as "seed" crystals will not prevent the remaining enzyme from precipitating amorphously. The solvent should also be added slowly so as to prevent rapid precipitation which results in an amorphous solid. Preferably the solvent is added portionwise with gentle stirring so that each portion is thoroughly and homogenously mixed before the next portion is added. Dropwise addition, with gentle stirring is preferred. The control of pH is important not only to control the extent of solubility of the enzyme but also because at extremes of pH the enzyme is unstable and the activity becomes irreversibly denatured. The maximum allowable limits of pH are from 4.5 to 9.5 with a pH range of 5.0 to 9.0 being the optimum working range. Within the allowable range of pH at which the enzyme is stable a solution having the higher values of pH will dissolve a considerably greater quantity of L-asparaginase than does a solution on the lower pH range. As a result of this, solvent precipitation of aqueous solutions having higher pH values requires a greater quantity of solvent than solvent precipitation of solutions having lower pH values. As much as 50 percent more solvent may be required at pH 9 than at pH 5 in order to effect the same degree of crystallization. Minimum solubility is observed at from about 5.0 to 6.0 with the crystallization preferably being carried out at a pH of about 5.1. Maximum solubility is observed between pH 8.0 and 9.0. The pH of the enzyme solution is adjusted with aqueous acids such as acetic acid or formic acid, and mineral acids such as hydrochloric acid or phosphoric acid. Bases, such as aqueous solutions of alkali metal hydroxides, carbonates and bicarbonates may be used to adjust the pH to the basic range. Sodium hydroxide, potassium carbonate and sodium bicarbonate are exemplary. The pH should be adjusted slowly; dropwise addition of base or acid with gentle stirring is preferable, so that localized areas of strongly acidic or basic content are avoided.

The temperature at which the crystallization takes place is determined by the stability of the enzyme and the freezing point of the mixed solvent system. In general, 40° C. is the maximum temperature used, for L-asparaginase is unstable and the activity is irreversibly denatured above that temperature. Since the enzyme is in aqueous solution, extremely low temperatures will tend to freeze the solution. The use of such low temperatures is thus to be avoided as being impractical for the facile crystallization of L-asparaginase. The temperature range utilized is from about 40° C. to about −20° C., 0° to 30° C. being preferable for the dissolution and crystallizing steps.

The process of this invention is carried out by dissolving dried crude L-asparaginase in a quantity of water so that the concentration, in terms of the amount of active enzyme present, is greater than 300 units per ml. of solution, or 3 mg. of the enzyme per ml. of solution. The pH is then adjusted to from 7.0 to 9.5 with dilute aqueous base, preferably at about room temperature. The water miscible organic solvent is then added very slowly in a quantity which will not cause amorphous precipitation. The pH is then adjusted to reduce the solubility of L-asparaginase; this pH adjustment may optionally be done before the solvent addition. The order of addition has been found to have no effect on the crystallization. The mixed solvent system is then aged at a temperature between −20° and 40° C. depending on the rapidity at which the crystals are to be formed, and whether larger or smaller crystals are preferred. The duration of the aging depends on the temperature at which the aging is done. Generally from 1 to 24 hours is sufficient, with the temperature being directly proportional to the duration of the aging, that is higher temperatures will require a longer aging period in order to obtain the same quantity of crystals.

If the pH adjustment is eliminated from the above process, a new process is obtained in which no added ions are present in the aqueous solution. This process could be advantageously used as a final step in which all low molecular weight, non volatile additives are eliminated. If crystals are desired in which there are no foreign ions, a series of crystallizations, culminating with this process would result in such a product.

The solvent addition can be eliminated from the first described process if it is thought that said solvents might precipitate a quantity of impurities along with the L-asparaginase. This is especially true when there is a large quantity of salt present in solution. The solubility of the salt in solution would not be affected by an adjustment in pH but in all probability would be precipitated to some extent by the addition of an organic solvent. Thus this process would be used for a solution of less pure L-asparaginase in which one of the main impurities is a salt. Such a solution would be exemplified by the solution obtained from the ammonium acetate or ammonium sulfate preliminary fractionation. There would be a large quantity of the ammonium salts in this solution. However, the recovery of L-asparaginase is somewhat diminished by this method owing to the greater precipitating powers of the organic solvents. A small amount of solvent, not enough to precipitate a quantity of salt, but enough to increase the yield would be advisable. A quantity 10 to 25 percent of the water volume would suffice.

The crystalline L-asparaginase obtained by this process is stable at room temperature, however, storage at 20° C. will improve the stability if prolonged storage is required. The L-asparaginase is reconstituted with sterile water prior to administration but is not capable of prolonged storage in solution, and when the solution is made up, it should be used quickly. Crystalline L-asparaginase as obtained by this process dissolved quickly in water, leaving a clear solution ready for administration, and provides no extraneous inorganic materials or other proteinaceous materials as contaminants.

In order that the process of this invention may be more fully understood, the following examples are presented. They should not, however, be construed as being limitative.

EXAMPLE 1

400 ml. of L-asparaginase having an activity of 10,900 units per ml. and a concentration of 39.0 mg. protein per ml. of solution is mixed with 4 ml. of 1 m. $NaH_2PO_4$. The solution is then cooled to 5° C. and adjusted to a pH of 7.4 with 10% NaOH. Cold (0° C.) ethanol is added to the solution with gentle agitation over 30 minutes, maintaining a temperature of 15° C. At the end of the addition of the ethanol the temperature is raised to 20° C. and the pH adjusted to 5.4 over 30 minutes with 10 percent aqueous acetic acid and gentle agitation. The crystalline suspension is then aged for 1 hour at 20° C. to complete the crystalline growth and centrifuged for 10 minutes at 20° C. which yields 27.6 g. of a wet paste containing 97 percent of the L-asparaginase activity. Microscopic examination and X-ray analysis shows the paste to be composed completely of a crystalline material. The vacuum dried crystals have 0.27 percent ash (sulfated) and a spectrographic analysis of the ash shows 0.1 percent trace materials.

EXAMPLE 2

4 g. of dry crude L-asparaginase (262,500 units per g.) is dissolved in 100 ml. of demineralized water and adjusted to a pH of 8.0 with 10% NaOH. The solution is cooled to 5° C. and 30 ml. of cold (0° C.) ethanol is added over 20 minutes with slow agitation maintaining a temperature of 15° C. The temperature is then raised to 20° C. and the solution adjusted to a pH of 5.5 with 10 percent acetic acid. The solution is slowly (30 minutes) cooled to 5° C. and aged overnight at that temperature. The crystalline slurry is then centrifuged for 10 minutes at 15° C. to collect the crystallized L-asparaginase. The centrifuged solids are dissolved in 80 ml. of demineralized water and adjusted to a pH of 7.4 with 5% $NaHCO_3$. The solution is clarified by centrifugation at 15° C. for 20 minutes and contains 95 percent of the dry solids activity. The solution on being lyophilized recovers anhydrous L-asparaginase at 0.87 percent ash (sulfated) and a spectrographic analysis of the ash shows that metals are less than 0.1 percent.

EXAMPLE 3

4 g. of dry crude L-asparaginase (262,500 units per g.) is dissolved in 100 ml. of demineralized water. The solution is cooled to 5° C. and 50 ml. of cold (0° C.) ethanol is added over 30 minutes with slow agitation maintaining the temperature at 5° C. The solution is aged overnight at this temperature. The crystalline slurry thus formed is centrifuged for 15 minutes at 10° C. to collect the crystallized L-asparaginase. The centrifuged crystalline material recovers 95 percent of the dry solids activity.

EXAMPLE 4

400 ml. of L-asparaginase solution having a concentration of 5,000 units per ml. is mixed with 4 ml. of 1 m. $NaH_2PO_4$. The solution is then cooled to 5° C. and adjusted to a pH of 8.0 by adding 5% NaOH. The pH is then adjusted to 5.1 over 30 minutes with 10 percent aqueous acetic acid and gentle agitation. The crystalline slurry is then aged for 24 hours at 4° C. in order to complete growth of the crystals, and centrifuged for 15 minutes at 20° C. The centrifuged solids are dissolved in 100 ml. demineralized water and the solution, clarified with filter cel, is lyophilized recovering dried L-asparaginase possessing 25 percent of the L-asparaginase activity of the original solution.

EXAMPLE 5

A solution of L-asparaginase having an activity of 306 units per ml. and a protein concentration of 3.1 mg./ml. in a non-buffered solution is cooled to 5° C. and the pH is adjusted to 8.0 with 15 percent aqueous sodium hydroxide. The solution is agitated gently and 25 ml. of cold (0° C.) methanol is added over 15 minutes keeping the temperature less than 10° C. The solution is adjusted to a pH of 5.5 at a temperature of 20° C. over 20 minutes using 10 percent aqueous acetic acid, maintaining gentle agitation. The solution is aged at 20° C. for 4 hours and overnight at 5° C. Observing no crystallization, another 25 ml. of methanol is added over 30 minutes at a temperature of 10° C. After another aging period of 24 hours at 5° C. crystals are observed. The crystalline slurry is centrifuged to collect the solid material which possessed 90 percent of the activity of the dilute starting solution. At the time of use, the solids would be dissolved in 20 ml. of distilled water and would provide 1,310 units of L-asparaginase activity per ml. of solution.

What is claimed is:

1. A process for the crystallization of L-asparaginase from an aqueous solution thereof at a pH of from 7.0 to 9.5 and containing at least 3 mg. of the enzyme per ml. of solution which comprises:

adding a lower alkanol to said solution;

adding, either subsequent to or prior to said lower alkanol addition, an aqueous solution of an acid sufficient to adjust the pH of the resultant solution to from 4.5 to 7.0;

aging said resultant solution at a temperature of from −20° to 40° C. for a duration of from 1 to 24 hours to complete crystal growth.

2. A process as defined in claim 1, in which the acid employed is acetic acid or a mineral acid, the lower alkanol is added in an amount equal to from 10 to 250 percent of the volume of the aqueous solution, and the aging temperature is from 0° to 30° C.

3. A process as defined in claim 2 in which the lower alkanol is ethanol added in an amount equal to from 50 to 100 percent of the water employed, and the lower pH range is from 5.0 to 6.0.

4. A process for the crystallization of L-asparaginase from an aqueous solution thereof at a pH of from 4.5 to 9.5 and containing at least 3 mg. of the enzyme per ml. of solution which comprises:

adding a loweralkanol to said aqueous solution and aging said crystals at a temperature of from −20° to 40° C. for a duration of from 1 to 24 hours to complete crystal growth.

5. A process as defined in claim 4 in which the loweralkanol is ethanol added in an amount equal to from 10 to 250 percent of the volume of the aqueous solution.

6. A process as defined in claim 5 in which the ethanol is added in an amount equal to from 50 to 100 percent of the volume of the water employed and the aging temperature is from 0° to 30° C.

7. A process for the crystallization of L-asparaginase from an aqueous solution thereof containing at least 3 mg. of the enzyme per ml. of solution which comprises:

adding to said aqueous solution a quantity of a base sufficient to adjust the pH of the resultant solution to from 7.5 to 9.5;

adding to said resultant solution a quantity of an acid sufficient to adjust the pH of the resultant solution to from 5.0 to 6.0; and aging said resultant solution at a temperature of from −20° to 40° C. for a duration of from 1 to 24 hours to complete crystal growth.

8. A process as defined in claim 7 in which the base employed is an alkali metal hydroxide, an alkali metal carbonate or an alkali metal bicarbonate and the acid employed is acetic acid or a mineral acid.

9. A process as defined in claim 8 in which the higher pH range is from 8.0 to 9.0, the lower pH range is from 5.0 to 6.0 and the aging temperature is from 0° to 30° C.

* * * * *